Patented July 3, 1923.

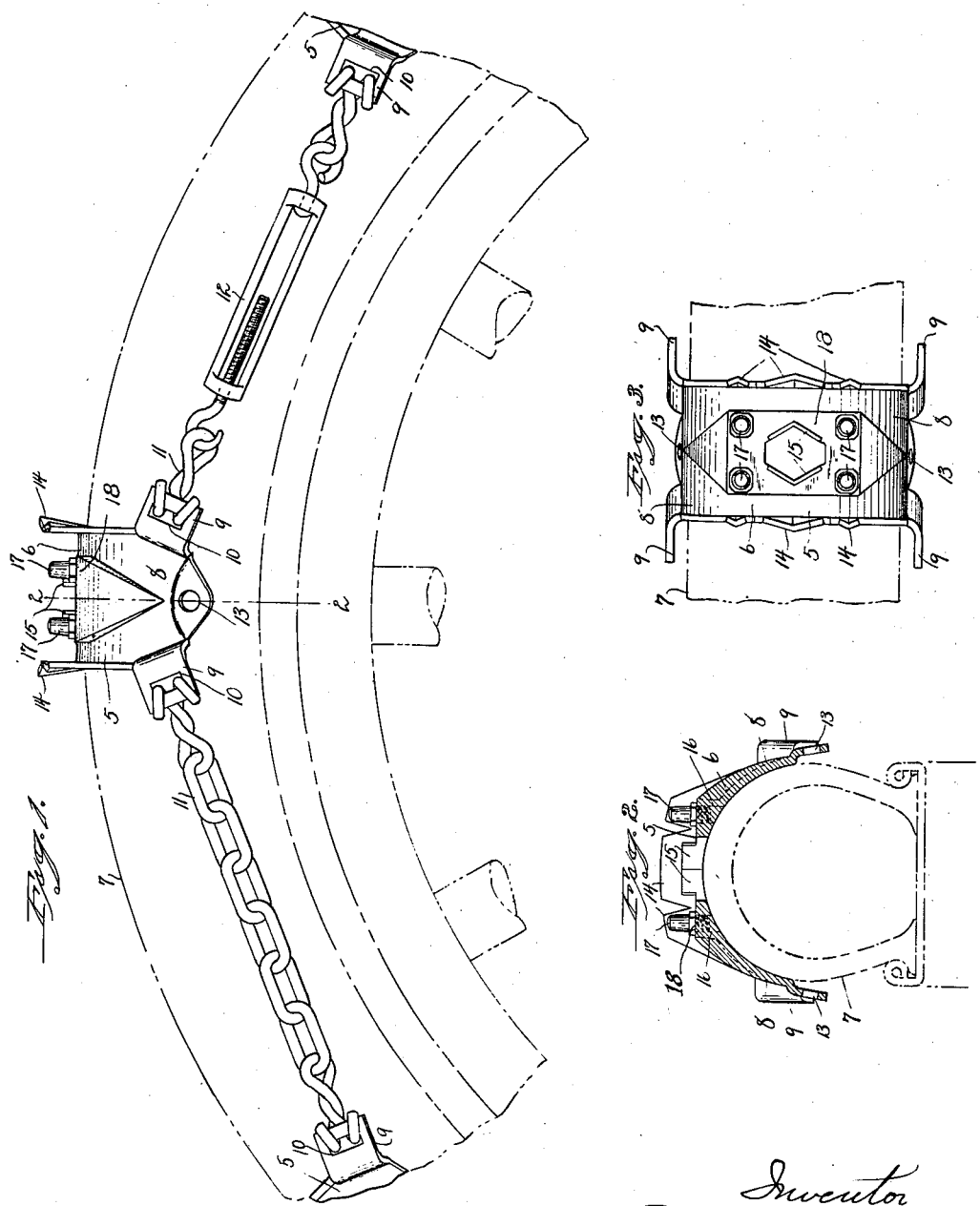

1,460,657

UNITED STATES PATENT OFFICE.

ROBERT R. KINTZ, OF MERIDEN, CONNECTICUT.

ANTISLIPPING ATTACHMENT FOR VEHICLE TIRES.

Application filed March 24, 1922. Serial No. 546,386.

*To all whom it may concern:*

Be it known that I, ROBERT R. KINTZ, a citizen of the United States, residing at Meriden, in the county of New Haven and State of Connecticut, have invented a new and useful Improvement in Antislipping Attachments for Vehicle Tires; and I do hereby declare the following, when taken in connection with the accompanying drawings and the characters of reference marked thereon, to be a full, clear, and exact description of the same, and which said drawings constitute part of this application, and represent, in—

Fig. 1 a side view of a portion of a vehicle tire, showing one of my improved antislipping devices applied thereto.

Fig. 2 a sectional view on the line 2—2 of Fig. 1.

Fig. 3 a top or plan view of one of the anti-slipping devices.

This invention relates to improvement in anti-slipping attachments for vehicle tires particularly adapted for use when traveling over icy or muddy roads, the object of the invention being a simple construction which is readily applied to the tire of a vehicle wheel and which will effectually provide projections or claws which will firmly grip the roadway and prevent slipping, and the invention consists in the construction as hereinafter described and particularly recited in the claims.

In carrying out my invention, I employ a series of saddles 5, each comprising a plate 6 adapted to extend across the face of a vehicle tire 7 and formed on opposite sides with inwardly-projecting arms 8, the inner ends of which being provided on opposite sides with fingers 9, each formed with a slot 10 for the attachment of chains 11, by which one saddle is connected with the next one. Preferably, and as herein shown, one of the chains on each side of the tire will include a turn-buckle 12, by which sufficient tension may be applied to hold the several devices in place. The inner ends of the arms are also preferably formed with perforations 13 for the reception of the usual form of tire-chain-holding devices. Projecting outward from each end of the plate are angular flanges 14, and in the center of the plate are angular flanges 15. The plate is also formed with a flat, centrally-arranged, raised face 18 in which is formed a series of threaded openings 16 for the reception of horseshoe calks 17 of common form, which may be readily removed and replaced, as occasion may require.

The required number of devices may be employed to encircle the tire, and by the use of turn-buckles the devices may be readily applied and removed from a tire. The saddles are formed from cast or sheet metal, and will withstand any strain imposed upon them and give a firm grip to the tire on icy or muddy roads. The angular flanges 14 and 15 co-act with the calks to prevent slipping sidewise, as well as to assist in giving the tire a firm grip upon the road.

I claim:

1. An anti-slipping device for vehicle tires, comprising a saddle, including a plate, and inwardly-projecting arms, said plate formed with outwardly-projecting angular flanges and formed with threaded openings for the reception of calks.

2. An anti-slipping device for vehicle tires, comprising a saddle, including a plate, having a centrally-arranged, flat face and inwardly-projecting arms, slotted fingers on opposite sides of each arm for the engagement of securing chains, said plate formed with outwardly-extending, angular flanges, the flat portion of the said plate also formed with threaded openings for the reception of calks.

3. An anti-slipping device for vehicle tires, comprising a saddle, including a plate, and inwardly-projecting arms, means for connecting a series of saddles, said plates formed at opposite ends with angular flanges and with centrally-arranged angular flanges, said plates also formed with a series of threaded openings for the reception of calks.

In testimony whereof, I have signed this specification in the presence of two subscribing witnesses.

ROBERT R. KINTZ.

Witnesses:
  GEORGE ROSE,
  EDWIN HIRSCHFELD.